United States Patent [19]

Wunsch et al.

[11] 4,234,246
[45] Nov. 18, 1980

[54] REMOTE CONTROLLABLE REARVIEW MIRROR

[76] Inventors: Erich Wunsch; Udo Wunsch; Eckart Wunsch, all of Im Hofrain 12,, D-7141 Schwieberdingen, Fed. Rep. of Germany

[21] Appl. No.: 942,284

[22] Filed: Sep. 14, 1978

[30] Foreign Application Priority Data

Sep. 14, 1977 [DE] Fed. Rep. of Germany ....... 2741290

[51] Int. Cl.³ .............................................. G02B 7/18
[52] U.S. Cl. ................................... 350/289; 248/487
[58] Field of Search ................... 350/289; 74/501 M; 248/487

[56] References Cited

U.S. PATENT DOCUMENTS 3,788,734  1/1974  McDuffee ............................ 350/289

FOREIGN PATENT DOCUMENTS

47-47846  8/1972  Japan ......................................... 350/289

Primary Examiner—Jon W. Henry
Attorney, Agent, or Firm—Martin A. Farber

[57] ABSTRACT

With a remote controllable rearview mirror for vehicles or the like, the mirror plate is suspended without play by means of pivotally-moveable articulations on at least two, preferably three points, which points are arranged spaced from one another, whereby one suspension point is stationary and connected rigidly with the mirror housing, while one or the other suspension points is fastened respectively on one swingable arm, which arm simultaneously can be formed as a transmission member of the control device, and is constrained for guidance in the plane of pivoting under friction such that there is present a quasi-rigid connection of the mirror plate with the mirror housing.

15 Claims, 11 Drawing Figures

REMOTE CONTROLLABLE REARVIEW MIRROR

The invention relates to a remote controllable adjusting or setting device with rearview mirrors of vehicles or the like, with a mirror plate universally swingably suspended in a mirror housing as well as control devices acting on the mirror plate, which control devices are controllable from a remote position.

Remote controllable rearview mirrors on motor vehicles are known, which can be adjusted from the place of the driver such that the rearward traffic occurrence can be comprehended by the driver.

With these known rearview mirrors, the mirror plate is fixedly mounted only at one point in the mirror housing so that a swingable construction is provided, which upon influence from vibrations and oscillations on the mirror housing leads to a shaking and vibration of the mirror plate, which is extremely disadvantageous insofar as in the driving operation, the mirror image wobbles and is distorted, so that the observation and judgement of the rear traffic event is greatly impaired and leads to incorrect evaluations of the same.

It is the task of the present invention therefor to propose a rearview mirror of the introductory-named type, by which the mirror plate is suspended and mounted in the mirror housing such that a mirror plate remains free from oscillations and vibrations under all operating conditions.

The task is attained characterized in the manner that the mirror plate is suspended free from play by means of swingably-moveable pivot hinges on at least two points, which points are arranged spaced from one another, whereby one suspension point is stationary and is rigidly connected with the mirror housing, while one or the other suspension points are fastened each on one swingable arm, respectively, and are guidably constrained in the pivot plane.

In further formation of the invention it is provided that the swingable arm is formed as a transmission member of the control device.

In an advantageous embodiment of the invention, the swingable arm is guided between friction surfaces such that a quasi-rigid connection exists with the mirror housing. In the manner that the quasi-rigid connection is placed in the direct vicinity of the respective suspension point, play which is present in the transmission members and in the control devices cannot cause disadvantages in the suspension of the mirror plate.

The invention is more closely described in the following on the basis of two embodiment examples in connection with the associated drawings.

In the drawings two embodiment examples of a rearview mirror for vehicles are illustrated, which rearview mirror e.g. can be arranged at the right side on the vehicle as an additional external mirror and which rearview mirror has an adjustment and setting device according to the present invention.

Figure 1:
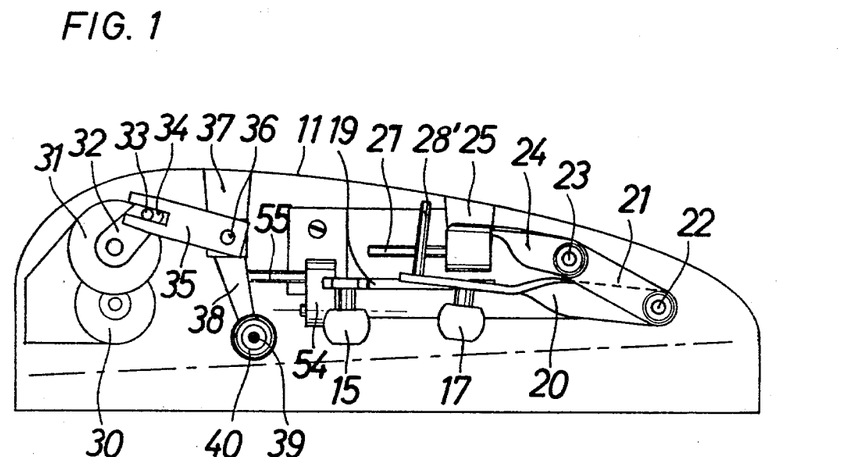
FIG. 1 a schematic illustration of a first embodiment example of an outside rearview mirror in top plan view, FIG. 2 a corresponding view of the mirror plate in horizontal section, FIG. 3 a schematic illustration of the back view of the rearview mirror of FIG. 1 with the mirror plate removed, FIG. 4 a view of the back side of the associated mirror plate, FIG. 5 the back view of a second embodiment example of an external rearview mirror with removed mirror plate, FIG. 6 a top plan view on the rearview mirror of FIG. 5, FIG. 7 the mirror plate belonging to the rearview mirror of FIG. 6 in section, FIG. 8 a side view of the rearview mirror illustrated in FIG. 5, and FIG. 9 a view of the associated mirror plate in section.

With the first embodiment example of a rearview mirror, the latter generally is designated with 10 and comprises the housing 11, which housing is provided with a fastening foot or base 12. By means of the base 12 the rearview mirror can be fixedly attached to the vehicle.

Figure 2:
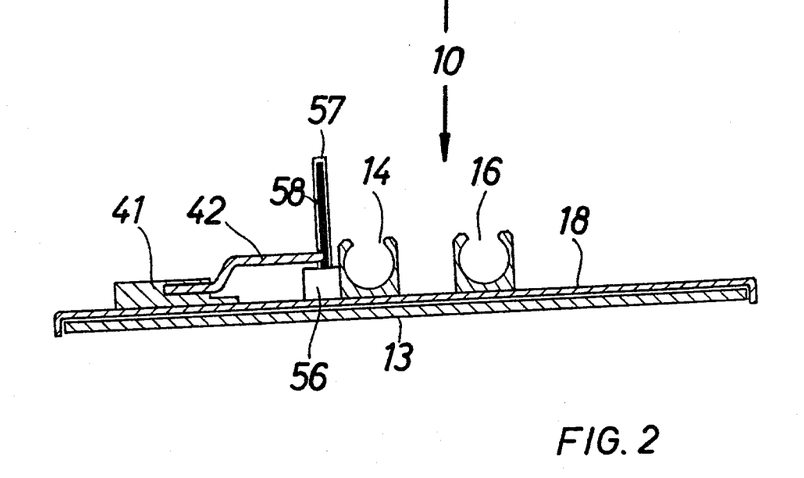
Figure 3:
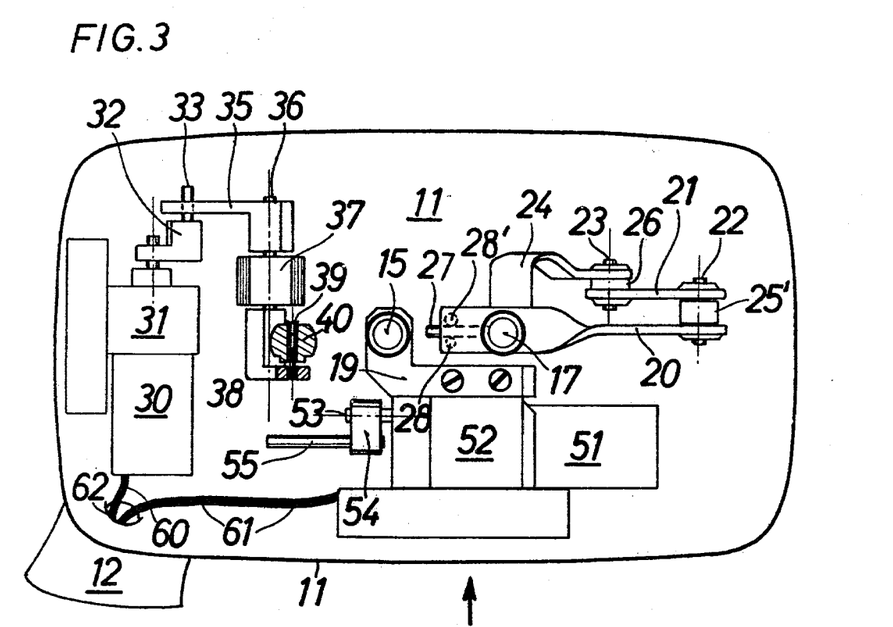
Figure 4:
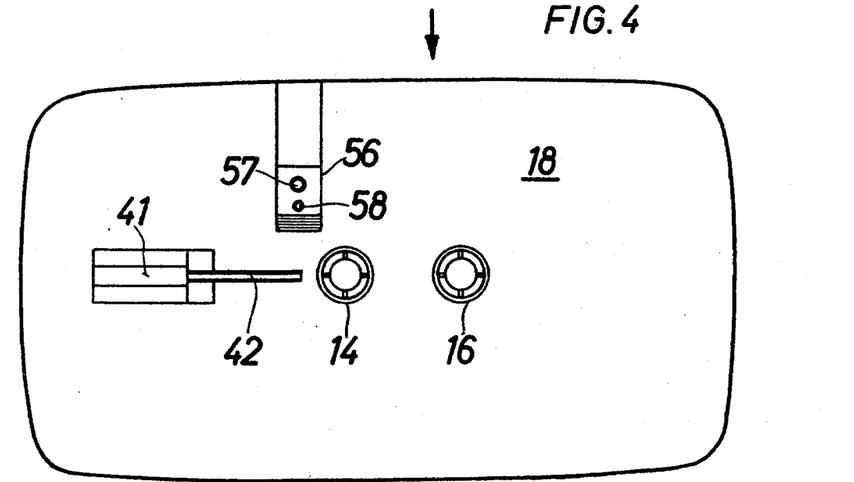

The mirror glass 13 is received by a mirror glass carrier 18. By means of two ball-and-socket joints 14, 15 and 16, 17, the carrier 18 is pivotally-movably suspended on the mirror housing, for which purpose the respective female parts 14 and 16, respectively, of the ball-and-socket joints are fastened on the back side of the mirror carrier plate 18 (if the mirror carrier plate is made of plastic, the female parts could even be die cast or injection molded), whereas the male part 15 which is arranged on the side of the mirror housing as a conterpiece is rigidly connected with the mirror housing 11 by means of a carrier 19.

With the second ball-and-socket joint 16, 17, the male part 17 is not rigidly connected with the mirror housing 11, but rather is fastened on an arm 20, which arm is mounted rotatably in a horizontal plane on a bracket 21 by means of rotary pivot 22. The bracket or arm 21 then in its turn is articulated to one carrier arm 24 by means of a rotary pivot 23, which carrier arm 24 is connected with a socket 25 of the mirror housing 11, the articulation to the carrier arm 24 being such that the second ball-and-socket joint 16, 17, together with the arm 20 and the bracket 21 are moveable in a plane extending substantially horizontally through the center point of the first ball-and-socket joint 14, 15.

The two rotary pivots 22 and 23 can be provided with frictional dampers 25' and 26, respectively (compare FIG. 3), which dampers are held under axial tension by spring plates or spring washers, in order to guarantee a mounting of the mirror plate which is free of shaking.

An additional guiding of the ball-and-socket joint 16, 17 in the horizontal plane is achieved by a guide pin 27, the latter being connected rigidly with the mirror housing 11 by means of the socket 25. The guide pin 27 is surrounded by two pins 28 and 28' (which pins are fastened to the arm 20 parallel to the pivot plane of the articulation 16, 17), such that the pins 28, 28' continuously contact the guide pin 27. For this purpose, the pin 28' which is fastened to the arm 20, is formed as a spring pin.

The second suspension point for the mirror plate 18, which second suspension point is formed by means of the second ball-and-socket joint 16, 17, is connected with the housing by means of the articulations 22 and 23 as well as the arm 20 and the bracket 21, such that the second suspension point in connection with the first suspension point (the latter being formed by means of the ball-and-socket joint 14, 15) can describe a circular path, in the horizontal pivot plane about the ball-and-socket joint which is rigidly connected with the mirror housing 11.

The control device for the mirror plate, which control device is accommodated in the mirror housing, comprises a first electrical drive unit 30, the latter taking care of the horizontal pivoting of the carrier plate 18 with the mirror 13 about a vertical axis. For this purpose the rotational movement of the electromotor 30 is transmitted by means of a step-down gearing 31 to a crank 32, which crank 32 with a pin 33 engages in a sliding slotted connecting link 34 of a pivot lever 35. The latter in its turn is pivotally mounted by means of a vertical axle 36 on a support lug 37 which is fixed to the mirror housing. By means of the axle 36, the swinging movement of the lever 35 is transmitted to an additional pivot lever 38, the latter having a rotatably mounted ball 40 on its free end on a vertical axle 39. For the transmission of the movement of the control device 30 to the mirror plate 18, the ball 40 grips or engages behind a spring pin, the latter being secured to the rear side of the carrier plate 18 by means of a socket 41, the spring pin with its free end extending in the line of connection of the ball-and-socket joints 14, 15; 16, 17 parallel to the rear side of the carrier plate 18 and spaced from the carrier plate. By means of this spring pin 42, the ball 40 is held in resilient contact engagement on the rear side of the mirror plate 18, so that a swinging movement of the lever 38 is transmitted to the carrier plate 18 and consequently to the mirror 13 as a tilting movement about the rigid suspension 14, 15 in the vertical axis which goes through the center point of this suspension.

Instead of the spring pin 42 also an angle leg (not illustrated) can be applied to the carrier plate 18, such that there arises a downwardly open guide track with two parallel guide surfaces, the guide track lying in the pivot plane of the second ball-and-socket joint 16, 17, which guide surfaces are spaced apart corresponding to the diameter of the ball 40 running between them. One of the guide surfaces thereby preferably forms the rear side of the carrier plate 18, while the other guide surface is formed from the free angle leg.

Upon the actuation of the setting device, the ball-and-socket joint 16, 17 (forming the second suspension) swings on a circular path about the stationary suspension point (the latter being provided by means of the first ball-and-socket joint 14, 15, the latter being fixedly connected with the mirror housing 11), whereby the lateral shifting of the arm 20 is equalized or compensated by the bracket 21.

With a modified embodiment of this mirror suspension, by which suspension a second moveable suspension point is provided for the mirror plate, the latter is fastened on a cylinder-piston arrangement, whereby the point of application or working point of the cylinder-piston arrangement (which point is on the side of the mirror) is located laterally shifted or offset with respect to the point of application or working point which is on the side of the mirror housing. The piston, which is preferably made of metal is formed as a pin; this pin is received under tension or being pressed by the cylinder which is made of plastic and the pin is guided with such a friction that forces originating or developing from the mirror glass and the mirror carrier plate due to accelerations acting on them, cannot overcome the friction of the piston in the cylinder. A displacement of the piston in the cylinder however is possible with adjustment and setting of the mirror plate.

According to another development of the invention, the mounting of the second suspension point, under certain circumstances also additional suspension points, can take place by means of a slider pendulum joint, which joint permits the suspension point 17 to vary its spacing relative to the back side of the mirror housing and simultaneously to execute a swinging movement in a horizontal plane.

A second control device with a horizontally disposed control axis is accommodated in the lower part of the mirror housing. The control device comprises an electromotor 51 with a stepdown transmission 52 which is connected following the motor 51, by means of which transmission the rotational movement is transmitted by means of the axle 53 to a crank 54, the latter being non-rotatably connecting with this axle. On its free end this crank carries a crank pin 55, which crank pin extends in the direction of the axle 53. The pin 55 grips or engages between two driver pins which are fastened on the rear side of the mirror carrier plate 18 perpendicularly to the plate 18 in a socket 56, of which one of the pins 57 has a larger diameter than the other, the latter with the smaller diameter being formed as a spring pin 58.

The spacing of both pins which extend parallel to one another corresponds to the diameter of the pin 55, the latter being clamped between the two guide pins 57 and 58. Upon swinging of the crank 54 by means of the adjustment or setting device 51, 52, the movement of the pin 55 is transmitted to the mirror carrier plate 18 and consequently to the mirror 13, the mirror 13 thereby being tilted about a horizontal axis, the latter going through the points of rotation of the ball-and-socket joints 14 to 17.

Respectively one slip clutch each is arranged between the crank 32 and the gearing 31 of the first control or adjustment unit as well as between the pivot lever 54 and the gearing 52 of the second control or adjustment unit. The slip clutch allows the mirror 13 to be adjusted by hand so that, on the one hand, a basic adjustment of the mirror can be performed by exerting a corresponding pressure on the mirror, on the sides of the mirror plate, and on the other hand, the mirror can still be adjusted by hand even during the loss or failure of one or both control units.

Abutments are provided for the cranks 32 and 54. These abutments limit the pivot movement of the cranks. If one of the cranks has moved to its abutment, the respective slip clutch goes into operation and allows the electromotor to idle or turn without loads so that the electromotor cannot be overloaded.

By electrical supply lines 60 and 61 which are led into the interior of the vehicle via an opening 62 in the mirror housing and through the mirror base 12, both electromotors are connected with an actuation switch (not illustrated) in the range of reach of the driver so that the driver can adjust the rearview mirror from his seat.

With the second embodiment example of a rearview mirror, which is illustrated in FIGS. 5-9, a three point suspension of the mirror plate is obtained, by which the second and third suspension point simultaneously serves as a point of application or working point for the two control devices 130, 131 and 151, 152, respectively. The first suspension point for the mirror plate 118 is provided by the ball-and-socket joint 114, 115, by which ball-and-socket joint, the male part 115 is fastened rigidly on the receiver 119 for the control units 130, 131 and 151, 152, respectively. The receiver 119 in its turn is connected with the mirror housing 111 by stay bolts 170. The female part 114 of this first ball-and-socket joint is mounted on the rear side of the mirror plate 118.

Figure 5:
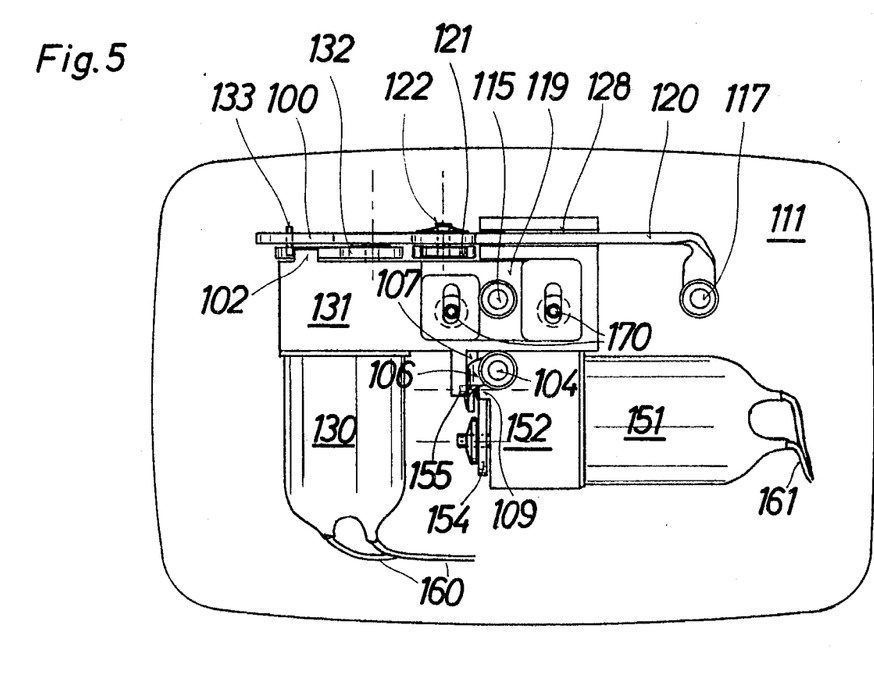
Figure 6:
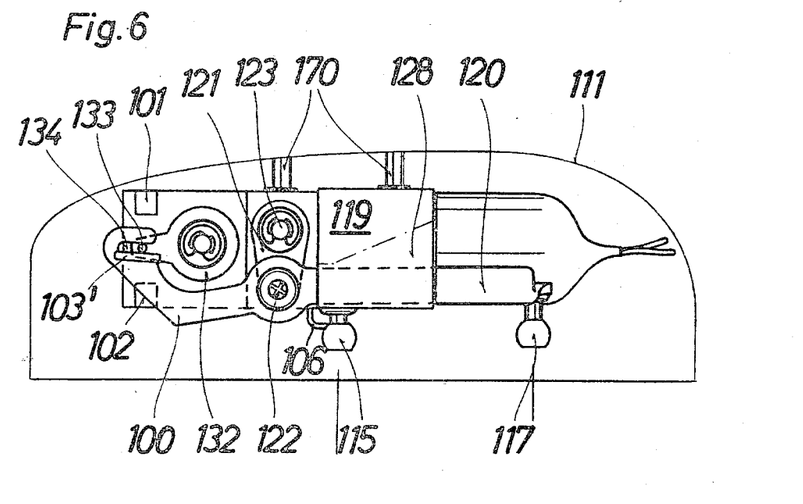
Figure 7:
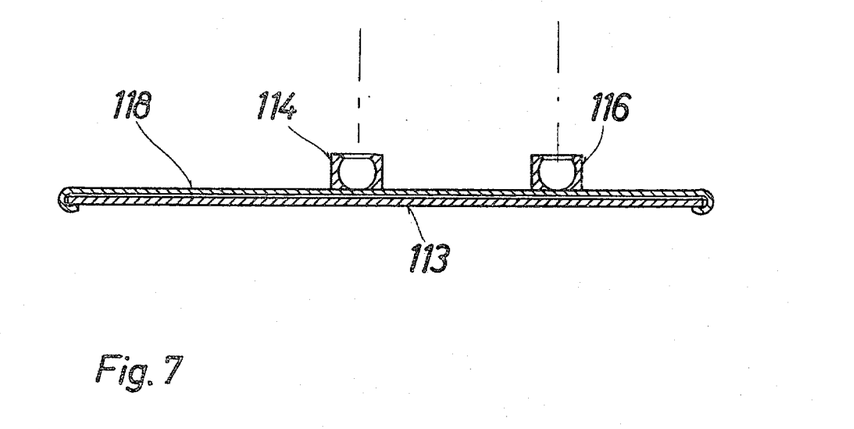

The second suspension point is formed by the ball-and-socket joint 116, 117, of which the male part 117 is mounted on an arm 120 which is angled-off on its end, which arm is formed as a lever and is rotatably mounted by means of a rotary bearing 122 on a bracket 121. The bracket 121 in its turn is pivotally secured to the receiver 119 by means of an additional rotary bearing 123. The arm 120 which is formed as a lever on its other end 100 has a recess 134, the latter extending approximately in the longitudinal extension of the arm 120. The pin 133 of a crank arm 132 engages the recess 134, the crank arm 132 can be pivoted from abutment to abutment 101, 102 via an intermediarily connected slip clutch by the control device 130, 131. Besides the pin 133 is thereby held by means of a spring or resilient element 103' in continuous contact on one side of the recess 134 in order to equalize or compensate for existing play. The movement of the crank is transmitted to the second suspension point 116, 117 by means of the arm 120, whereby the mirror plate 118 is pivoted about a substantially vertical axis.

The slip clutch which is connected between the drive axle of the adjustment device 131 and the crank arm 132 is formed with respect to its transmission of the moment of rotation such that, on the one hand, the drive motor 130 continues turning when the crank arm 132 has arrived on one of its abutments 101, 102, and, on the other hand, however it transmits such a moment of rotation that the friction which the arm 120 experiences in the slot guide 128 is exceeded with certainty, the slot guide 128 being formed in the receiver 119.

The friction which is exerted by the slot guide 128 on the lever arm 120 is calculated or designed such that the moment of rotation which is exerted on the ball-and-socket joint 116, 117 by acceleration of the mirror glass and of the mirror carrier plate 118, in no case suffices to shift the arm 120 in the slot guide 128, so that there is obtained a quasi-rigid connection of the ball-and-socket joint 116, 117 and consequently the second suspension point with the housing 111. In order to produce a friction of the necessary amount, the slot which is formed in the receiver, the latter being made of plastic, is produced in snug-fit or press-fit with the arm 120, the latter being produced of flat material. Instead of the slot guide formed in the receiver 119, however even a friction and guide surface pressing on the arm 120 can be provided, the pressure of the guide surface being adjustable and readjustable.

Instead of the linking or articulation of the arm 120 by means of a bracket 121 on the receiver 119, substantially at the height of the bearing 122, a longitudinal hole can be provided in the arm, through which hole a guide pin engages, the latter being rigidly mounted on the receiver 119.

By arrangement of a slip clutch between the drive shaft of the control unit 131 and the crank arm 132, it is guaranteed that with loss or failure of the control unit 130, 131, the mirror plate 118 can be adjusted by hand, in the manner that next to the first suspension point 114, 115 a corresponding pressure is exerted on the mirror plate 113, 118 by hand.

Figure 10:
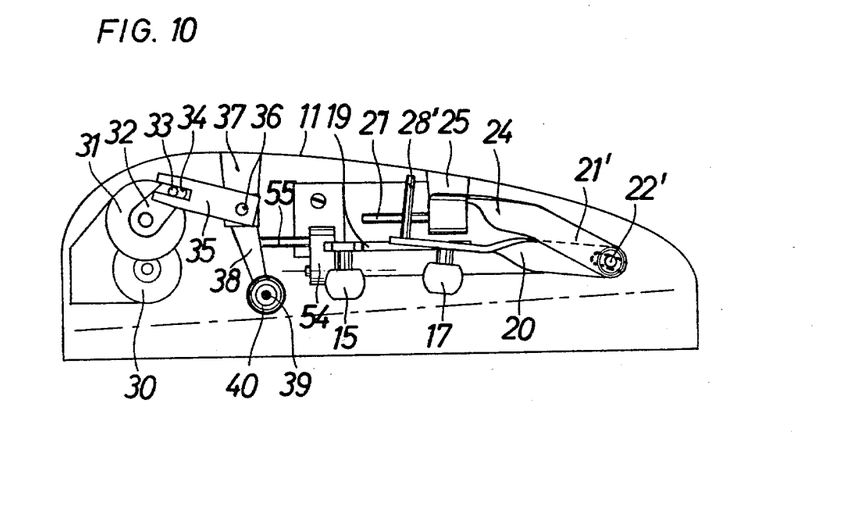
FIGS. 10 and 11 are views similar to FIGS. 1 and 6 however of a different embodiment showing a slotted hole with a guide pin therein.

As evident from the embodiment of FIG. 10 instead of the bracket 21 and a pivot 23, the carrier arm 24 is lengthened by a bracket 21' which is connected rigidly with the carrier arm 24, whereas the arm 20 has a longitudinal hole 22', by means of which the arm is laterally displaceable and simultaneously swingably suspended on the carrier arm 24, 21', so that with a swinging movement of the mirror plate, and respectively, of the mirror holder 18 about the pivot point 15 (the latter being stationary and rigidly connected with the mirror housing 11), a resulting lateral displacement of the suspension point 17 can be equalized or compensated as a consequence of the circular movement of same.

Figure 11:
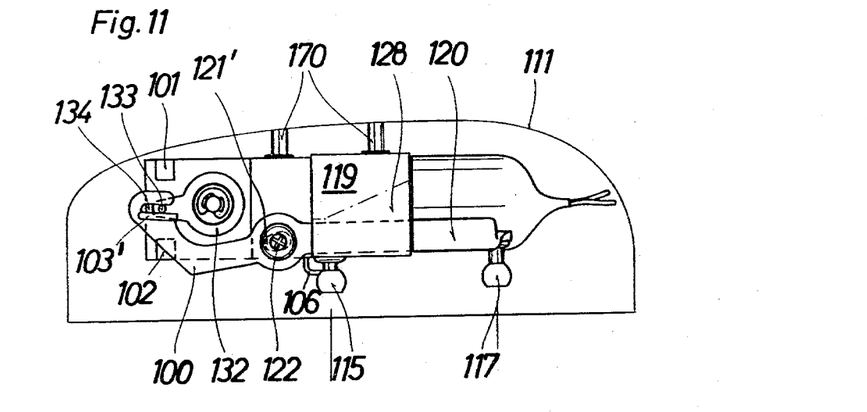

The same applies for the embodiment illustrated in FIG. 11, by which the lateral displacement of the arm 120 is compensated due to the lateral displacement through the longitudinal hole 121' which is provided in the arm 120, 100, the lateral displacement resulting about the stationary pivot point 115 as a result of the circular movement of the suspension point 117.

Figure 8:
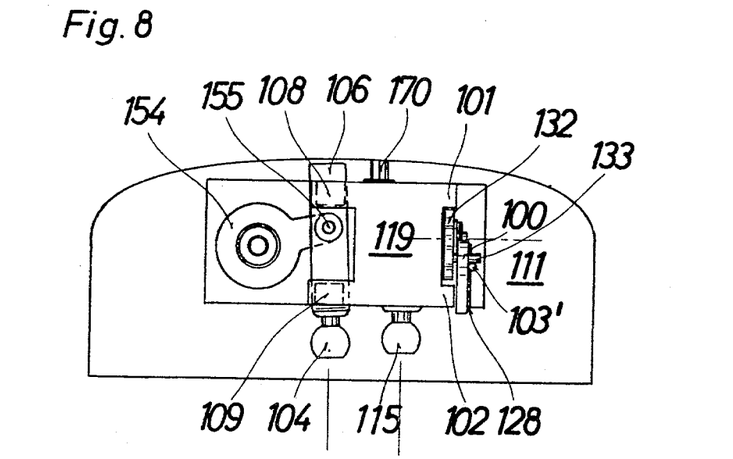
Figure 9:
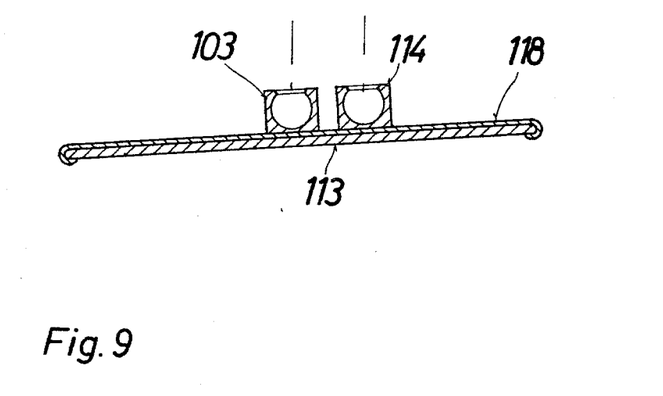

The third suspension point for the mirror plate, which suspension point is provided with this embodiment of a rearview mirror, is formed by a third ball-and-socket joint 104, 103 (compare FIG. 8, in which the electrical drive unit 130 has not been illustrated). The third suspension point simultaneously is the point of application or working point for the second control device 151, 152, which control device causes the tilting of the mirror plate 113, 118 about the horizontal axis, the latter lying in the line of connection of the ball-and-socket joints 114, 115 an 116 117, respectively. For this purpose the male part 104 of the third ball-and-socket joint is fastened on an angled-off arm 106. The arm 106 is mounted and guided in an additional slot guide 107, the latter being formed in the receiver 119. The slot guide 107 has a recess in the swinging range of the crank 154; simultaneously, abutments 108 and 109 are formed in the receiving-sided part of the slot guide 107, which part is on the side of the receiver, which abutments 108 and 109 limit the swinging movement of the crank 154, the latter being non-rotatably connected with the second adjustment device 151, 152 via an additional slip clutch.

The crank 154 on its free end carries a crank pin 155. The crank pin engages in a bore in the arm 106, so that a swinging movement of the crank 154 is transmitted to the mirror plate via the arm 106 and the third ball-and-socket joint 103, 104.

The arm 106 is mounted again under friction in the slot guide 107 such that, on the one hand, a tilting of the arm is impossible and, on the other hand, the arm cannot be shifted in its guide by forces originating from the mirror glass and the mirror carrier plate, since these forces are too small to overcome or exceed the static friction of the arm 106 in the slot guide 107, so that even in this case a quasi-rigid connection of the third suspension point with the mirror housing 111 is provided.

On the other hand, the transmission of the moment of rotation of the slip clutch of the second adjustment device is designed such that upon its actuation the friction of the arm 106 in the slot guide 107 is overcome or exceeded with certainty. Furthermore also this slip clutch insures that with loss or failure of the control device 151, 152, the mirror plate still can be adjusted by hand and beyond that an overloading of the electrical drive unit 151 is avoided, if the crank 154 is located on one of its abutments 108 and 109, respectively.

The ball-and-socket joints 103, 104; 114, 115 and 116, 117 form the corner points of a right-angle triangle, with the right angle at the stationary ball-and-socket joint 114, 115. By this measure it is attained that the control device 130, 131 exclusively causes a tilting of the mirror plate about a vertical axis which falls within the line of connection of the ball-and-socket joints 103, 104 and 114, 115, respectively, while the control device 151, 152 exclusively causes a tilting of the mirror plate 118 about the line of connection of the ball-and-socket joints 114, 115 and 116, 117 without influencing the tilted position in the respective prevailing other axis.

We claim:

1. A remote controllable adjusting setting device with rearview mirros, comprising
   a mirror housing,
   a mirror plate,
   control means for acting on said mirror plate, said control means being controllable from a remote position,
   means constituting pivotal articulations for suspending said mirror plate to said housing without play on at least two suspension points, respectively, each said articulations constituting ball and socket joints, said suspension points being arranged spaced from one another, all said articulations having one part of said ball and socket joints directly mounted on said mirror plate,
   the other part of one of said ball and socket joints of one of said articulations of one of said suspension points being stationary and is rigidly connected with said mirror housing, the other part of the other of said ball and socket joints of the other of said suspension points being displaceable relative to said mirror housing,
   swingable arm means for absorbing external forces respectively connected to said other part of said ball and socket joints of the other of said suspension points, respectively, and to said housing and including frictional restraining means for guidably constraining said other part of said ball and socket joints of said other suspension points in a pivot plane thereof through the stationary one of said suspension points and for simultaneously holding said mirror plate fixed relative to said housing against external vehicle movement forces, said ball and socket joints being frictionless relative to said frictional restraining means, said control means for operatively overcoming said frictional restraining means.

2. The adjusting device according to claim 1, wherein said swingable arm means constitutes a transmission member of said control means.

3. The adjusting device as set forth in claim 1, wherein
   said control means constitutes at least one electrical setting motor.

4. The adjusting device as set forth in claim 3, wherein
   said electrical setting motor includes a slip clutch.

5. A remote controllable adjusting setting device with rearview mirrors comprising
   a mirror housing,
   a mirror plate,
   control means for acting on said mirror plate, said control means being controllable from a remote position,
   means constituting pivotal articulations for suspending said mirror plate in said housing without play, on at least two suspension points, respectively, said points being arranged spaced from one another,
   one of said articulations of one of said suspension points being stationary and is rigidly connected with said mirror housing,
   a swingable arm means respectively connected to each of at least one of the other of said suspension points for guidably constraining said at least one of the other of said suspension points in the pivot plane thereof,
   slot guides fixedly connected with said mirror housing,
   said swingable arm means is guided in said slot guides.

6. The adjusting device according to claim 5, wherein
   said swingable arm means is guided in said slot guides under friction such that said swingable arm means is quasi-rigidly connected with said mirror housing.

7. The adjusting device according to claim 6, wherein
   the quasi-rigid connection of said swingable arm means with said mirror housing is directly adjacent said other of said suspension points.

8. The adjustment device according to claim 6, wherein
   said slot guides have at least one surface resiliently lying on said swingable arm means.

9. A remote controllable adjusting setting device with rearview mirrors, comprising
   a mirror housing,
   a mirror plate,
   control means for acting on said mirror plate, said control means being controllable from a remote position,
   means constituting pivotal articulations for suspending said mirror plate in said housing without play, on at least two suspension points, respectively, said points being arranged spaced from one another,
   one of said articulations of one of said suspension points being stationary and is rigidly connected with said mirror housing, the other of said suspension points being displaceable relative to said mirror housing,
   a swingable arm means respectively connected to each of at least one of the other of said suspension points for guidably constraining said at least one of the other of said suspension points in the pivot plane thereof through the stationary one of said suspension points,
   a bracket rotatably operatively connected with said mirror housing,
   said swingable arm means is articulated on said bracket.

10. A remote controllable adjusting setting device with rearview mirrors, comprising
    a mirror housing,
    a mirror plate,
    control means for acting on said mirror plate, said control means being controllable from a remote position,
    means constituting pivotal articulations for suspending said mirror plate in said housing without play, on at least two suspension points, respectively, said points being arranged spaced from one another,
    one of said articulations of one of said suspension points being stationary and is rigidly connected with said mirror housing, the other of said suspension points being displaceable relative to said mirror housing,
    a swingable arm means respectively connected to each of at least one of the other of said suspension points for guidably constraining said at least one of the other of said suspension points in the pivot plane thereof through the stationary one of said suspension points, said swingable arm means is formed with a longitudinal hole, said guide pin engages through said longitudinal hole.

11. The adjusting device according to claim 10, wherein said bracket constitutes an intermediate articulation member between said arm means and said mirror housing and two pivot points thereof.

12. In a remote controllable adjusting setting device with rearview mirrors of vehicles with a mirror plate suspended pivotally in a mirror housing by means of articulations, whereby one fixed articulation constitutes a fixed ball and socket joint defining one suspension point is stationary and rigidly connected with the mirror housing, and with control devices which are controllable from a remote place acting on the mirror plate, the improvement comprising at least one suspension constituting a per se universally pivotal, movable ball and socket joint is operatively connected to the mirror housing and connected to the mirror plate, combined means for constraining guiding with frictional means for absorbing external force, said combined means is for guiding said at least one suspension such that said movable ball and socket joint is constrained thereby in a path of movement thereof and for simultaneously holding said mirror plate fixed relative to said housing against external vehicle movement forces but not against forces from an operative condition of the control devices.

13. The adjustment device as set forth in claim 12, wherein said combined means includes guides cooperatively acting on a corresponding of said at least one suspension directly adjacent the mirror plate.

14. The adjusting device as set forth in claim 12, wherein said at least one suspension is a part of the control devices.

15. The adjusting device as set forth in claim 12, wherein said combined means includes guide means forming a slit therebetween for operatively constrained guiding of said at least one suspension.

* * * * *

UNITED STATES PATENT AND TRADEMARK OFFICE
CERTIFICATE OF CORRECTION

PATENT NO. : 4,234,246
DATED : November 18, 1980
INVENTOR(S) : Erich Wunsch et al It is certified that error appears in the above-identified patent and that said Letters Patent are hereby corrected as shown below:

Colum 9, line 4 (Claim 10) after this line the following paragraph is inserted:

-- a guide pin fixedly connected with said mirror housing,--

Signed and Sealed this

Twenty-first Day of April 1981

[SEAL]

Attest:

RENE D. TEGTMEYER

Attesting Officer    Acting Commissioner of Patents and Trademarks